(12) United States Patent
Wagenhuber et al.

(10) Patent No.: US 8,149,135 B2
(45) Date of Patent: Apr. 3, 2012

(54) DATA EXCHANGE SYSTEM AND METHOD BETWEEN TWO OR MORE VEHICLES TO WHICH IDENTIFICATION INFORMATION IS ASSIGNED

(75) Inventors: Josef Wagenhuber, Gerolsbach (DE); Burkhard Kuhls, Stadtbergen (DE); Max Kicherer, Munich (DE); Harry Knechtel, Berglern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 469 days.

(21) Appl. No.: 12/269,374

(22) Filed: Nov. 12, 2008

(65) Prior Publication Data

US 2009/0128363 A1   May 21, 2009

(30) Foreign Application Priority Data

Nov. 16, 2007   (DE) .......................... 10 2007 056 354

(51) Int. Cl.
*C08G 1/00* (2006.01)

(52) U.S. Cl. ....................... 340/901; 340/905

(58) Field of Classification Search .................. 340/901, 340/902, 905, 995.1; 701/213, 301
See application file for complete search history.

(56) References Cited

U.S. PATENT DOCUMENTS

| | | | | |
|---|---|---|---|---|
| 4,706,086 A | * | 11/1987 | Panizza | .......................... 340/902 |
| 6,791,472 B1 | * | 9/2004 | Hoffberg | ....................... 340/905 |
| 6,798,354 B2 | * | 9/2004 | Schuessler | ..................... 340/901 |
| 6,989,765 B2 | * | 1/2006 | Gueziec | ......................... 340/905 |
| 2007/0109146 A1 | | 5/2007 | Tengler et al. | |
| 2007/0188348 A1 | * | 8/2007 | Bauer et al. | .................... 340/905 |
| 2008/0042876 A1 | * | 2/2008 | Bauer et al. | .................... 340/905 |

FOREIGN PATENT DOCUMENTS

| | | |
|---|---|---|
| DE | 102 34 595 A1 | 2/2004 |
| DE | 10 2005 013 648 A1 | 9/2006 |
| DE | 10 2006 005 690 B3 | 6/2007 |
| EP | 1 788 749 A1 | 5/2007 |

OTHER PUBLICATIONS

German Search Report dated Aug. 13, 2008 with English translation (Nine (9) pages).

* cited by examiner

*Primary Examiner* — John A Tweel, Jr.
(74) *Attorney, Agent, or Firm* — Crowell & Moring LLP

(57) ABSTRACT

A system and method are provided for direct data exchange between two or more vehicles for transmission of data relating to events having a negative effect on driving safety, via wireless communication such as WLAN in particular. Unambiguous identification information is assigned to each vehicle. To increase acceptance of such a system, the identification information of the respective vehicle is temporary and is formed on the basis of the current status of the vehicle.

13 Claims, 1 Drawing Sheet

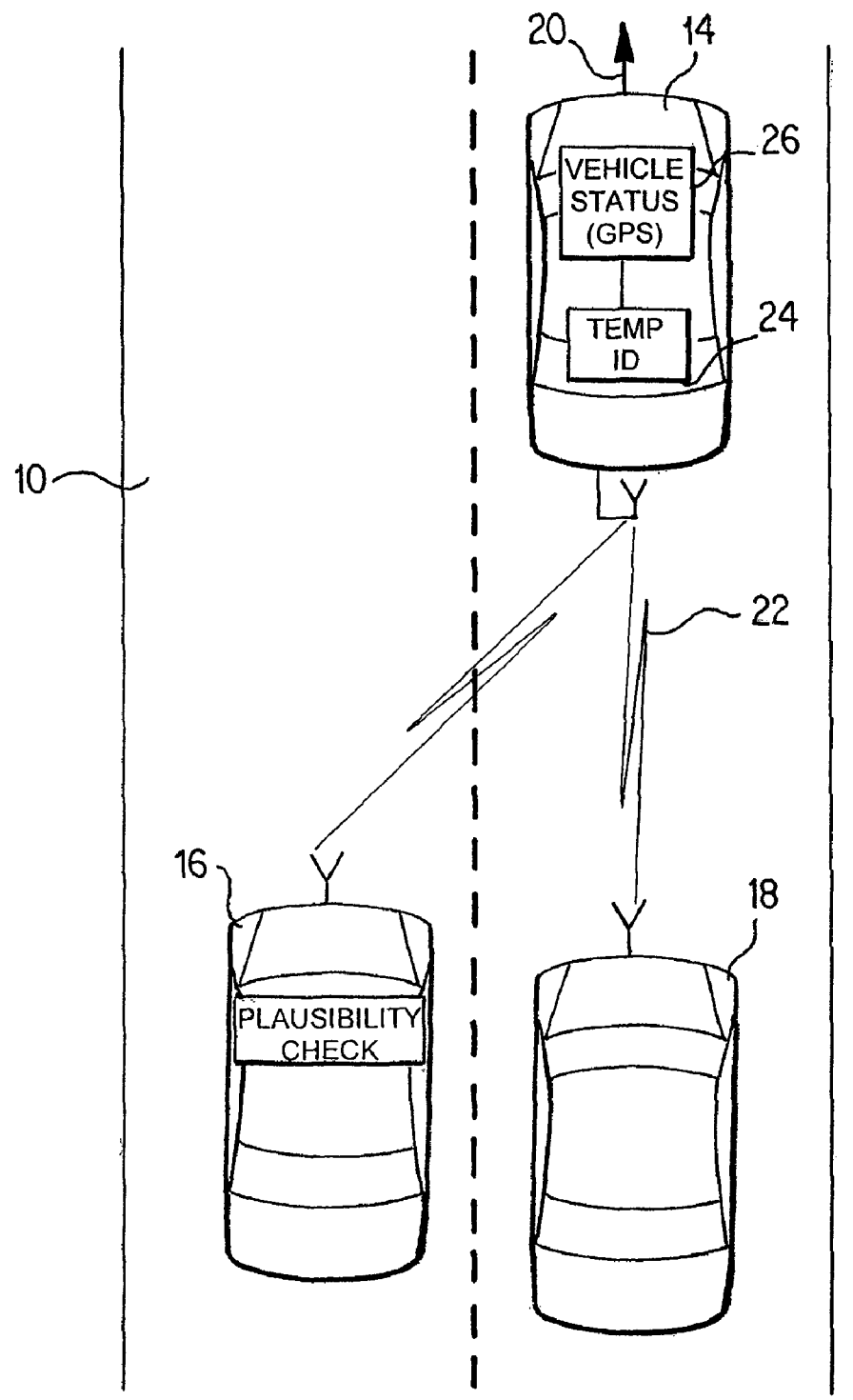

DATA EXCHANGE SYSTEM AND METHOD BETWEEN TWO OR MORE VEHICLES TO WHICH IDENTIFICATION INFORMATION IS ASSIGNED

CROSS-REFERENCE TO RELATED APPLICATION

This application claims priority under 35 U.S.C. §119 to German Patent Application No. DE 10 2007 056 354.1, filed Nov. 16, 2007, the entire disclosure of which is herein expressly incorporated by reference.

BACKGROUND AND SUMMARY OF THE INVENTION

The invention relates to a system and method for direct data exchange between two or more vehicles for transmission of data relating to events that interfere with driving safety, via a wireless communication, such as WLAN in particular, wherein unambiguous identification information is assigned to each vehicle.

With such known systems for so-called vehicle-to-vehicle communication of traffic-relevant messages from one vehicle assessing the situation to one or more neighboring or following vehicles, such as a warning message about slippery road conditions or an accident, the information about the identity of the vehicle detecting the traffic situation being reported is transmitted to the following vehicles.

The object of the invention is, in particular, to increase the acceptance for use of such a system.

This object is achieved through a system for direct data exchange between two or more vehicles for transmission of data relating to events having a negative effect on driving safety, via a wireless communication means, such as in particular WLAN, wherein unambiguous identification is assigned to each of the vehicles. The identification information about the respective vehicle is temporary and is formed on the basis of a current status of the vehicle. Advantageous further embodiments are described herein.

An important aspect of the present invention consists of the fact that according to the invention, the identification information about the respective vehicle is temporary and is formed on the basis of the current status of the vehicle.

Through the inventive further embodiment of the invention, the anonymity of each of the vehicles is preserved, and nevertheless they can be differentiated in that unambiguous identification information is assigned to each of them.

In one embodiment of the invention, the current status of the vehicle is determined by the position of the vehicle based on GPS information, by the mileage reading of the vehicle, and/or the direction of travel of the vehicle. In the case of a vehicle equipped with a GPS navigation system, this information is readily available on the databus of the vehicle for use by the inventive system without any great effort and can be utilized for individualizing the respective vehicle.

It is self-evident that other data describing the current status of the vehicle, at least in part, may be used to form the identification information about the respective vehicle.

In one embodiment of the invention, it is provided that the current time is used to form the identification information. In this way, it is immediately discernible how current the identification information is.

In a further embodiment of the invention, the formation of the identification information about the respective vehicle on the basis of the current status of the vehicle is repeated periodically or after a predetermined distance has been traveled. The risk of manipulation of the data exchange can be greatly reduced through these measures.

In one embodiment of the invention, it is provided that the identification information is obtained by applying a so-called "hash" function to the current status and/or to the corresponding state vectors to describe the current status such as the vehicle position, its mileage reading, or the direction of travel of the vehicle. This ensures that the identification information is practically always unambiguous.

In a further embodiment of the invention, it is provided that a device for checking the plausibility of the identification information transmitted by another vehicle is provided in each of the vehicles. Such a device additionally reduces the risk of manipulation of the data exchange.

In one embodiment of the invention, it is provided that the vehicles exchanging data directly with one another also exchange cryptographic keys before the start of the data exchange. The keys thereby exchanged are used for encryption of the data exchanged subsequently and/or the identification information exchanged. This is also a suitable measure for preventing manipulation of the inventive system.

Other objects, advantages and novel features of the present invention will become apparent from the following detailed description of one or more preferred embodiments when considered in conjunction with the accompanying drawings.

BRIEF DESCRIPTION OF THE DRAWING

The FIGURE provides a schematic illustration of the system and method of direct data exchange between two or more vehicles in accordance with the present invention.

DETAILED DESCRIPTION OF THE DRAWING

The FIGURE provides a general illustration of a system and method for direct data exchange between two or more vehicles 14, 16, 18 for transmission of data 22 relating to events having a negative effect on driving safety. As shown, the data 22 is transmitted via a wireless communication such as WLAN. In the FIGURE, the vehicles 14, 16, 18 are shown traveling in the direction of arrow 20 on roadway 10. Each vehicle 14, 16 and 18 is assigned unambiguous identification information.

The identification information about a respective vehicle is temporary and is formed on the basis of a current status of the vehicle. As shown, for example, vehicle 14 forms a temporary ID 24 based on vehicle status information 26. The current status 26 of the vehicle may be determined by its position based on GPS information, its odometer reading, its direction of travel, etc.

In one embodiment of the invention, the temporary identification information 24 transmitted with the data 22 is checked in another vehicle 16 for plausibility. This additionally reduces the risk of manipulation of the data exchange.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for exchanging data, comprising:
   a first vehicle;
   a second vehicle;

a wireless communication system providing for a direct exchange of data between the first and second vehicles, said data relating to events having a negative effect on driving safety;

wherein unambiguous identification information is assigned to the first and second vehicles, said unambiguous identification information about a respective vehicle being temporary and formed on a basis of a current status of the respective vehicle.

2. The system according to claim 1, wherein the current status of the vehicle is determined by at least one of: (a) a position of the vehicle based upon GPS information, (b) a mileage reading of the vehicle, and (c) a direction of travel of the vehicle.

3. The system according to claim 1, wherein the identification information is a function of a current time.

4. The system according to claim 2, wherein the identification information is a function of a current time.

5. The system according to claim 1, wherein the identification information formed on the basis of the current status of the vehicle is periodically formed after a predetermined distance has been traveled by the vehicle.

6. The system according to claim 1, wherein the identification information is obtained by applying a hash function to the current status of the vehicle.

7. The system according to claim 6, wherein the hash function is applied to a corresponding state vector of the vehicle position, the odometer reading, or the traveling direction.

8. The system according to claim 1, further comprising a plausibility checker operatively configured in each vehicle, the plausibility checker checking the plausibility of identification information transmitted by another vehicle.

9. The system according to claim 1, further comprising:

cryptographic keys exchangeable between the first and second vehicles before initiating the direct data transmission, said cryptographic keys being used for encrypting the data subsequently exchanged and/or the identification information exchanged.

10. A vehicle for use in a system of direct data exchange between the vehicle and one or more other vehicles, the vehicle comprising:

means for communicating data directly from the vehicle to the one or more other vehicles, said data relating to events having a negative effect on driving safety; and means for assigning unambiguous identification information to the vehicle, said identification information being temporary and being formed on a basis of a current status of the vehicle.

11. The vehicle according to claim 10, further comprising means for determining the current status of the vehicle via at least one of a position of the vehicle based on GPS information, an odometer reading of the vehicle, and a direction of travel of the vehicle.

12. The vehicle according to claim 11, wherein a current time is utilized by the temporary identification information means in forming the identification information.

13. A method for exchanging data between two or more vehicles:

determining, in one vehicle, an event having a negative effect on driving safety;

forming an unambiguous identification for the vehicle, the unambiguous identification being temporary and formed on a basis of a current status of the vehicle; and transmitting from the one vehicle for receipt directly by another vehicle, data relating to the event having the negative effect on driving safety along with the formed unambiguous identification information about the vehicle.

* * * * *